US012704239B2

(12) United States Patent
Grassi

(10) Patent No.: US 12,704,239 B2
(45) Date of Patent: Aug. 11, 2026

(54) NON-IMAGING ASYMMETRIC WALL WASH FIXTURE FOR DOWNLIGHTS

(71) Applicant: LMPG Inc., Longueuil (CA)

(72) Inventor: David Grassi, Montreal (CA)

(73) Assignee: LMPG Inc., Longueuil (CA)

( * ) Notice: Subject to any disclaimer, the term of this patent is extended or adjusted under 35 U.S.C. 154(b) by 75 days.

(21) Appl. No.: 18/618,719

(22) Filed: Mar. 27, 2024

(65) Prior Publication Data

US 2025/0305656 A1 Oct. 2, 2025

(51) Int. Cl.

| | |
|---|---|
| ***F21V 5/08*** | (2006.01) |
| ***F21S 8/02*** | (2006.01) |
| ***F21V 5/04*** | (2006.01) |
| ***F21V 7/00*** | (2006.01) |
| ***F21V 7/09*** | (2006.01) |
| ***F21V 7/24*** | (2018.01) |
| ***F21V 13/04*** | (2006.01) |
| *F21Y 101/00* | (2016.01) |
| *F21Y 115/10* | (2016.01) |

(52) U.S. Cl.

CPC ................ *F21V 5/08* (2013.01); *F21S 8/026* (2013.01); *F21V 5/045* (2013.01); *F21V 7/0008* (2013.01); *F21V 7/0091* (2013.01); *F21V 7/09* (2013.01); *F21V 7/24* (2018.02); *F21V 13/04* (2013.01); *F21Y 2101/00* (2013.01); *F21Y 2115/10* (2016.08)

(58) Field of Classification Search

CPC .......... F21V 5/08; F21V 5/045; F21V 7/0008; F21V 7/0091; F21V 7/09; F21V 7/24; F21V 13/04; F21Y 2101/00; F21Y 2115/10; F21S 8/026

See application file for complete search history.

(56) References Cited

U.S. PATENT DOCUMENTS

| | | | | |
|---|---|---|---|---|
| 6,994,456 B1 * | 2/2006 | Russo | .................... | F21V 7/0091 362/147 |
| 10,145,519 B1 * | 12/2018 | Portinga | ................. | F21V 21/04 |
| 10,190,736 B1 * | 1/2019 | Pyshos | .................. | F21V 7/0091 |

(Continued)

FOREIGN PATENT DOCUMENTS

| | | |
|---|---|---|
| CN | 108167713 A | 6/2018 |
| CN | 116877955 A | 11/2023 |

OTHER PUBLICATIONS

International Search Report and Written Opinion issued in International Application No. PCT/US2025/020797 on May 19, 2025, 15 pages.

*Primary Examiner* — Kevin Quarterman

(74) *Attorney, Agent, or Firm* — ArentFox Schiff LLP; Joseph M. Maraia

(57) ABSTRACT

A wall wash lighting fixture includes an input end at which light enters the fixture and an output end at which light exits the fixture. A longitudinal axis of the fixture extends longitudinally from the input end to the output end. The fixture includes a light source for emitting light into an interior of the fixture at the input end of the fixture. The fixture includes an optical element for receiving the light from the input end of the fixture. The optical element has a plurality of extraction elements for altering a path of the light passing through the fixture, such that light exiting the fixture at the output end of the fixture is directed laterally with respect to the longitudinal axis.

13 Claims, 19 Drawing Sheets

(56) References Cited

U.S. PATENT DOCUMENTS

| | | | | |
|---|---|---|---|---|
| 10,955,112 | B2 * | 3/2021 | Portinga | F21V 5/045 |
| 11,428,398 | B1 | 8/2022 | Portinga et al. | |
| 11,719,398 | B1 * | 8/2023 | Shettigar | F21S 8/026<br>362/298 |
| 2002/0080602 | A1 | 6/2002 | Jones | |
| 2015/0241027 | A1 * | 8/2015 | Zhang | F21V 7/0033<br>362/300 |
| 2017/0343190 | A1 * | 11/2017 | Georgiev | F21V 23/06 |

* cited by examiner

NON-IMAGING ASYMMETRIC WALL WASH FIXTURE FOR DOWNLIGHTS

BACKGROUND

1. Technical Field

The present disclosure is related to lighting systems and, in particular, to wall wash lighting fixtures for downlights.

2. Discussion of Related Art

Wall washing for interior downlights is a lighting technique that involves using recessed downlights, such as light-emitting diode (LED) downlights, to illuminate a vertical surface such as a wall in an indoor or outdoor space. This technique is often used in architectural and interior design to enhance the aesthetics of a space and create a warm and inviting atmosphere. The downlights are typically positioned in the ceiling close to the wall and aimed or pointed at a specific angle to create a desired, e.g., uniform, distribution of light across the wall, without creating harsh shadows or glare. Wall washing for interior downlights can be used to highlight architectural features, artwork, or décor on the wall, and to enhance the texture and color of the wall itself. The technique can also help create a sense of depth and dimensionality in a room, and can be used to visually enlarge a small space.

In some conventional downlights, the wall washing is achieved by tilting the fixture so that some amount of the light impinges on the adjacent wall. One drawback to this approach is that the tilted downlight fixture breaks the ceiling plane. That is, in these conventional approaches, the downlight fixture protrudes from the ceiling plane, which is undesirable effect architecturally because the luminaire or fixture draws attention to the fixture itself rather than blending seamlessly into the space.

SUMMARY

In at least one aspect, the subject disclosure related to a wall wash lighting fixture. The fixture includes an input end at which light enters the fixture and an output end at which light exits the fixture. A longitudinal axis of the fixture extends longitudinally from the input end to the output end. The fixture includes a light source for emitting light into an interior of the fixture at the input end of the fixture. The fixture includes an optical element for receiving the light from the input end of the fixture. The optical element has a plurality of extraction elements for altering a path of the light passing through the fixture, such that light exiting the fixture at the output end of the fixture is directed laterally with respect to the longitudinal axis.

In some embodiments, the path of the light is altered by the optical element by internal reflection of the light. In some cases, the path of the light is altered by the optical element by refraction of the light.

In some embodiments, the fixture is mountable on a ceiling adjacent to a wall, a plane of the ceiling being substantially coplanar with the output end of the fixture, the longitudinal axis of the fixture being substantially orthogonal to the plane of the ceiling, such that the light exiting the fixture is directed toward the wall to illuminate the wall. Further, in some embodiments, each of the plurality of extraction elements has a surface forming a predetermined angle with the plane of the ceiling to provide a desired illumination pattern on the wall. In some instances, the plurality of extraction elements are formed progressively closer to the output end of the fixture. In some cases, one of the extraction elements includes a plurality of angled step features formed in a surface of the extraction element. Further, in some instances, the angles of the angled step features are selected to provide a desired illumination pattern on the wall. In some embodiments, the plane of the ceiling and the wall are substantially perpendicular.

In some embodiments, the optical element is a unitary device including the plurality extraction elements integrally formed in the optical element. In some cases, the optical element is made of an optically transparent material. In some embodiments, the optical element can be one of the following: acrylic; glass; polycarbonate; and silicone. In some instances, the light source is a light-emitting diode (LED) light source.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
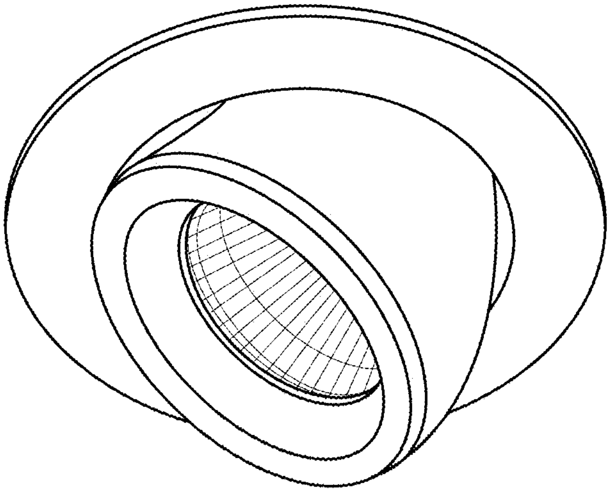
FIG. 1 (Prior Art)
FIG. 1 is an image of a conventional wall wash downlight fixture.

In some conventional downlights, the wall washing is achieved by tilting the fixture so that some amount of the light impinges on the adjacent wall. FIG. 1 includes an image of a conventional wall wash downlight fixture tilted to obtain the wall washing effect. One drawback to this approach is that the tilted downlight fixture breaks the ceiling plane. That is, in these conventional approaches, the downlight fixture protrudes from the ceiling plane, which is undesirable effect architecturally because the luminaire or fixture draws attention to the fixture itself rather than blending seamlessly into the space.

Figure 2:
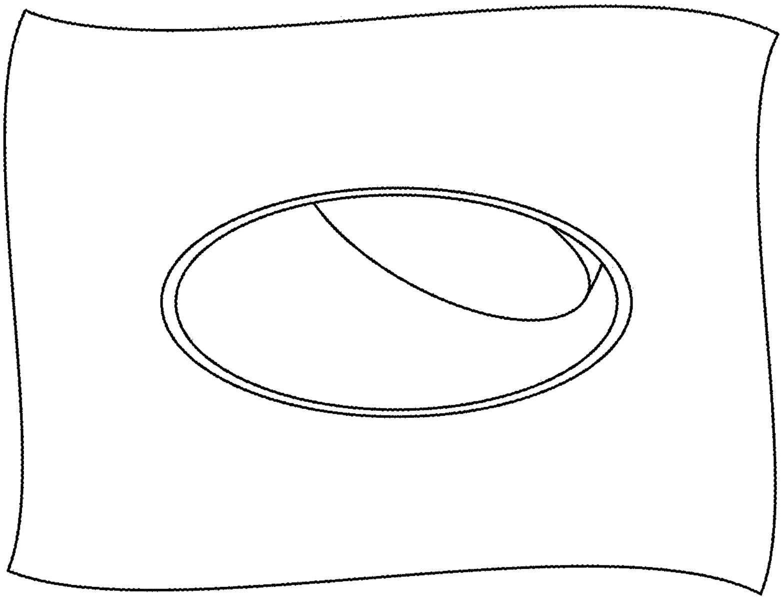
FIG. 2 (Prior Art)
FIG. 2 is an image of another conventional wall wash downlight fixture.

In another conventional approach to wall washing, the fixture is recessed into the ceiling, as illustrated in FIG. 2, which includes an image of another conventional wall wash downlight fixture. In this configuration, the light leaves the fixture asymmetrically, with some relatively larger amount of light being directed toward the wall than away from the wall. In this conventional configuration, the entire fixture/luminaire is recessed, and a tilted lens/diffuser is angled towards the wall. The observer perceives the light being directed towards the wall, and the recessed lens/diffuser is less obvious to the observer than the tilted fixture of FIG. 1. This approach provides a less offensive wall washing feature, and also can produce less glare when the observer is looking at the fixture.

The configuration of FIG. 2 has a drawback in that it typically uses a reflector or total internal reflection (TIR) optical element delivering a wide light distribution, such that less light that is possible with such a system is directed toward the wall. Ideally, for a wall washing downlight, 100% of the light would be directed toward the wall, but, in reality, the percentage of light directed toward the wall is more typically in the range of 25% to 50% in fixtures such as that illustrated in FIG. 2.

Figure 3:
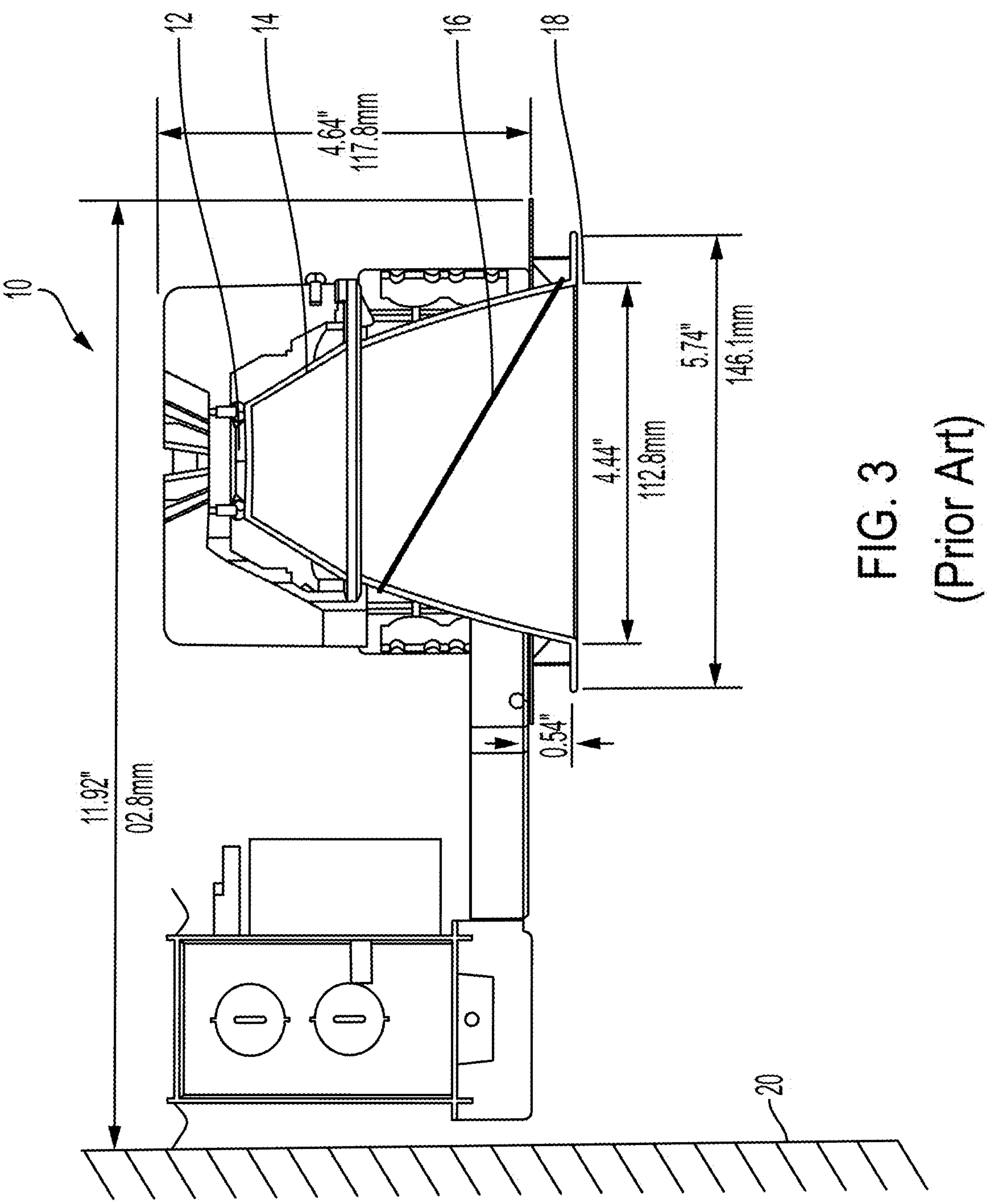
FIG. 3 (Prior Art)
FIG. 3 is a schematic diagram of a conventional wall wash downlight fixture.

FIG. 3 includes a schematic diagram of a conventional wall wash downlight fixture 10. Fixture 10 includes a light source such as an LED light source 12, which emits light in the down direction into the interior of fixture 10. A reflector-based collimator system 14 collimates the light and contains it by internal reflection within the interior of fixture 10 and directs the light down toward the output of fixture 10. A tilted diffuser/lens 16 directs the output light in the direction of a wall 20 to be illuminated by fixture 10. The output light exits fixture 10 at ceiling plane 18, which is typically at the same height as the ceiling in which fixture 10 is mounted. The drawback of collimator system 14 is that it only controls around 40% of the light from the light source 12. By contrast, embodiments of the wall wash lighting fixture disclosed herein control 100% of the light, directing it overwhelmingly toward the wall in a uniform manner.

Figure 4:
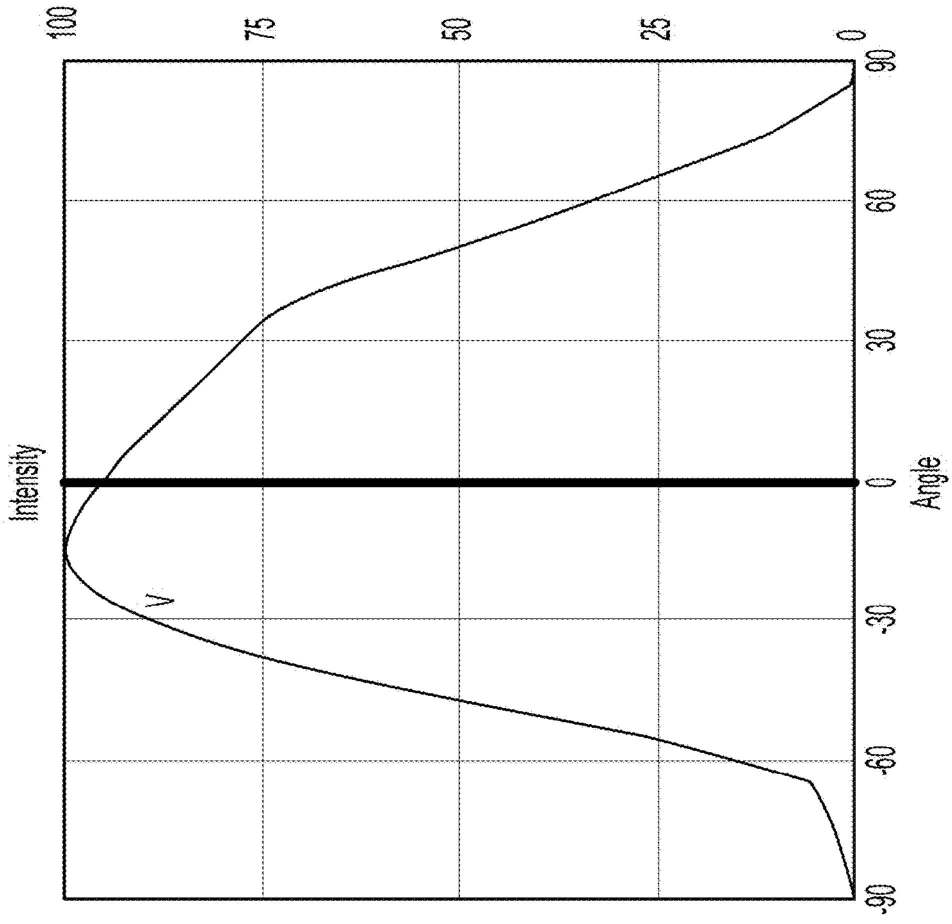
FIG. 4 (Prior Art)
FIG. 4 is an intensity profile in cartesian format for a typical reflector-based wall wash lighting system, such as that illustrated in FIG. 3.

Because fixture 10 uses a reflector-based collimator 14, only about 40% of the light is controlled, and reflectors are not ideal for creating asymmetric distributions such as the distribution typically required of a wall wash illumination system. FIG. 4 is an intensity profile in cartesian format for a typical reflector-based wall wash lighting system, such as that illustrated in FIG. 3.

The profile of FIG. 4 provides the distribution curve of the luminaire or fixture of a reflector-based wall wash lighting system. The amount of light being directed toward the wall can be calculated by integrating the area underneath the curve. For the example of FIG. 4, 59% of the light is being directed toward the wall. However, because the distribution is so wide, only about 25% to 35% of the light will actually reach the wall.

Figure 5:
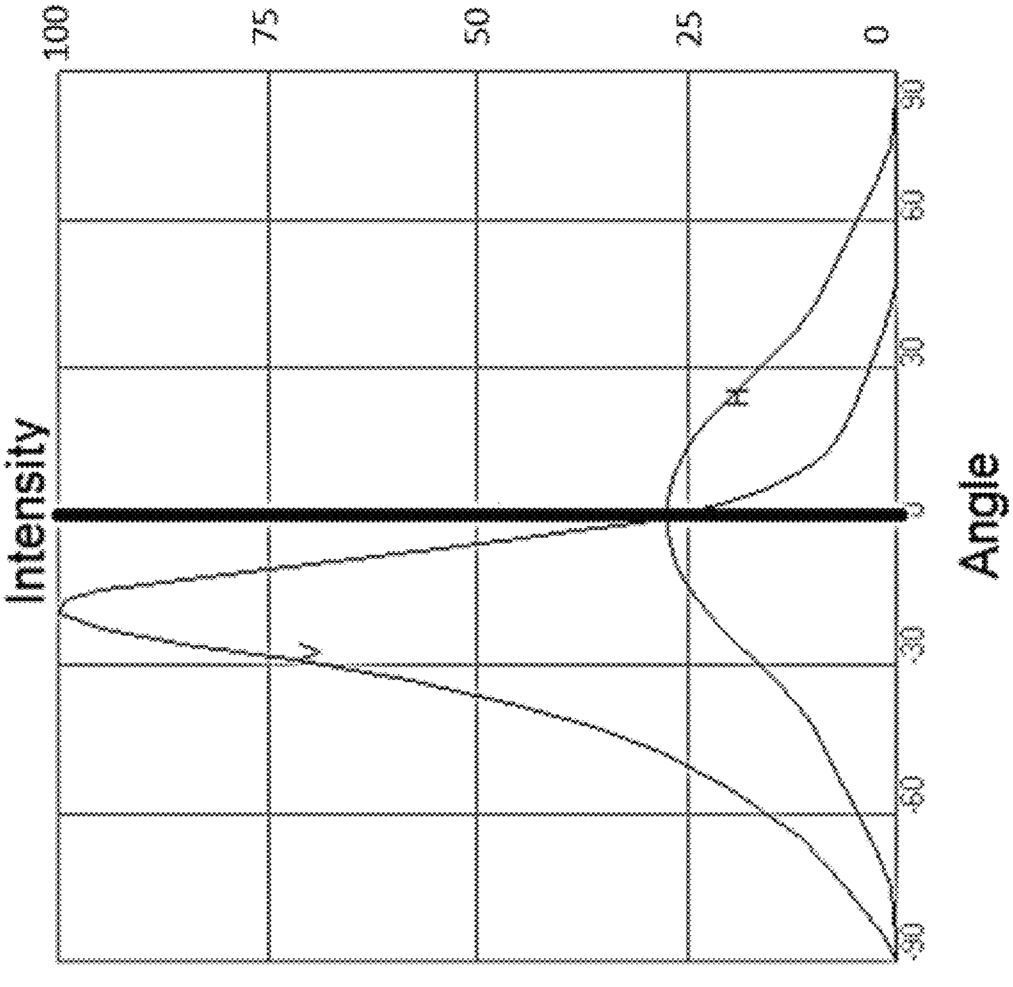
FIG. 5 is an intensity profile in cartesian format for a wall wash downlight fixture/system according to some exemplary embodiments.

In contrast, in accordance with the present disclosure, a wall wash downlight lighting fixture is provided which greatly increases the amount of light which reaches the wall. FIG. 5 is an intensity profile in cartesian format for a wall wash downlight fixture/system according to the current disclosure, which illustrates significant improvement over the profile for a conventional system illustrated in FIG. 4. Referring to FIG. 5, according to the present technology, almost 90% of the light is directed toward the wall in a tight directed beam.

Figure 6:
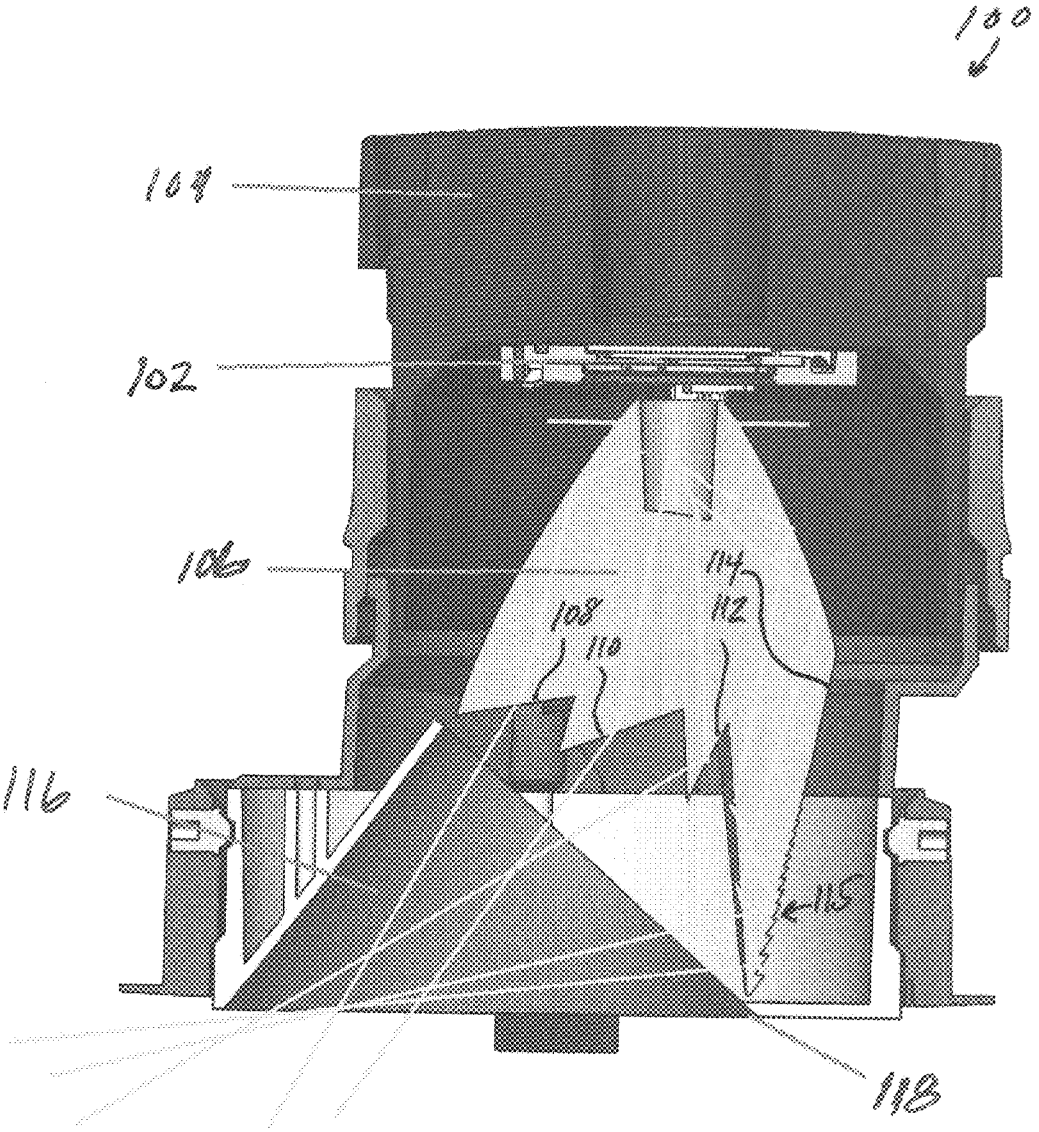
FIG. 6 is a schematic diagram of a wall wash downlight fixture or system, according to the current disclosure.

FIG. 6 is a schematic diagram of a wall wash downlight fixture or system 100, according to some exemplary embodiments. Referring to FIG. 6, fixture 100 includes a source of light such as an LED light source 102, which emits light in the down direction into the interior of fixture 100. A heat sink 104 to which the LED light source 102 is mounted dissipates heat from the LED light source 102. The light passes through an optical element 106 and bezel 116 and exits fixture 100 at ceiling plane 118.

Optical element 106 contains the light within its interior by total internal reflection (TIR) from its interior surfaces. Optical element 106 includes multiple progressively higher extraction elements 108, 110, 112, 114, which reflect the light out of fixture 100 toward the wall to be illuminated. Extraction element 114 includes a plurality of angled steps 115 formed on its surface. The extraction elements include angled surfaces to direct the light out of fixture 100 in a desired direction. The angles of the surfaces are selected such that the light emitted from fixture 100 is directed only at the wall at specific angles, which allows the vast majority of the light to be directed toward the wall, both evenly and efficiently, to produce the desired wall illumination profile. Optical element 106 can be made of, for example, a transparent material such as glass, acrylic, polycarbonate, silicone, or other suitable optical material.

The fixture 100 with optical element 106 allows for wall wash downlight illumination with reduced glare and a nearly 100% increase in light levels on the wall, while providing illumination with greatly increased uniformity. The fixture 100 provides for a reduction in glare and improved glare control in a number of different ways. In some embodiments, the use of the optical element 106 disclosed herein directs roughly 95% of the light through the fixture 100 precisely to the wall, rather than into the surrounding space where glare would be apparent. In the arrangements disclosed herein, the source 102 is also shifted further back in the fixture 100, opening up the aperture through which the light exits the fixture 100 to maximize the light directed towards the wall while not hitting reflectors which would cause the light to bounce back to an observer as glare.

Figure 7:
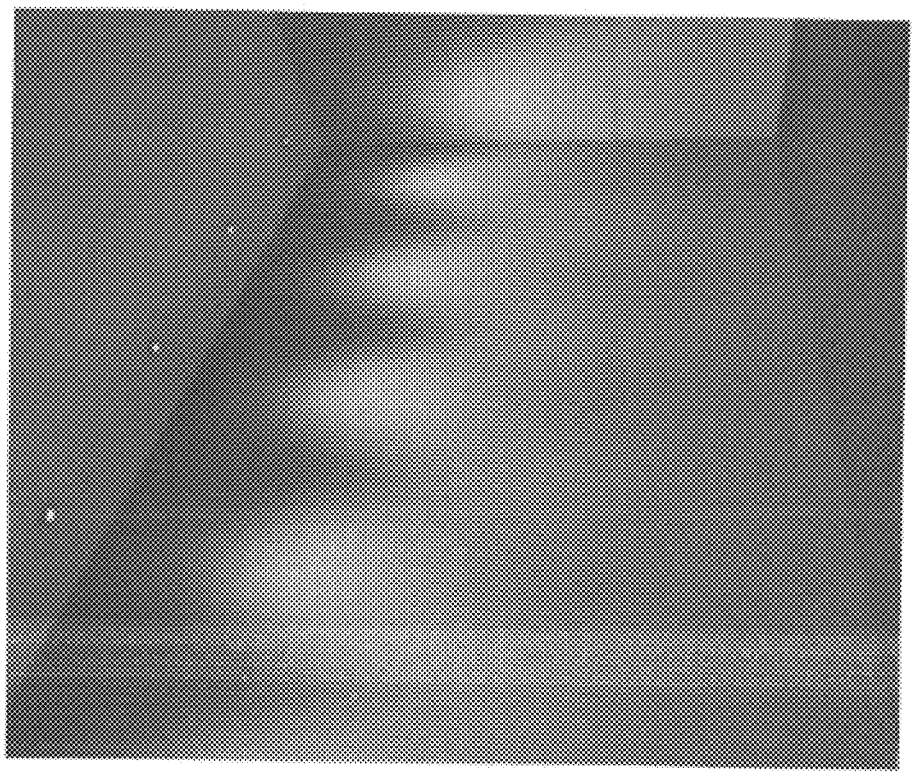
FIG. 7 is an image of a wall illuminated by a conventional wall wash downlight system.
Figure 8:
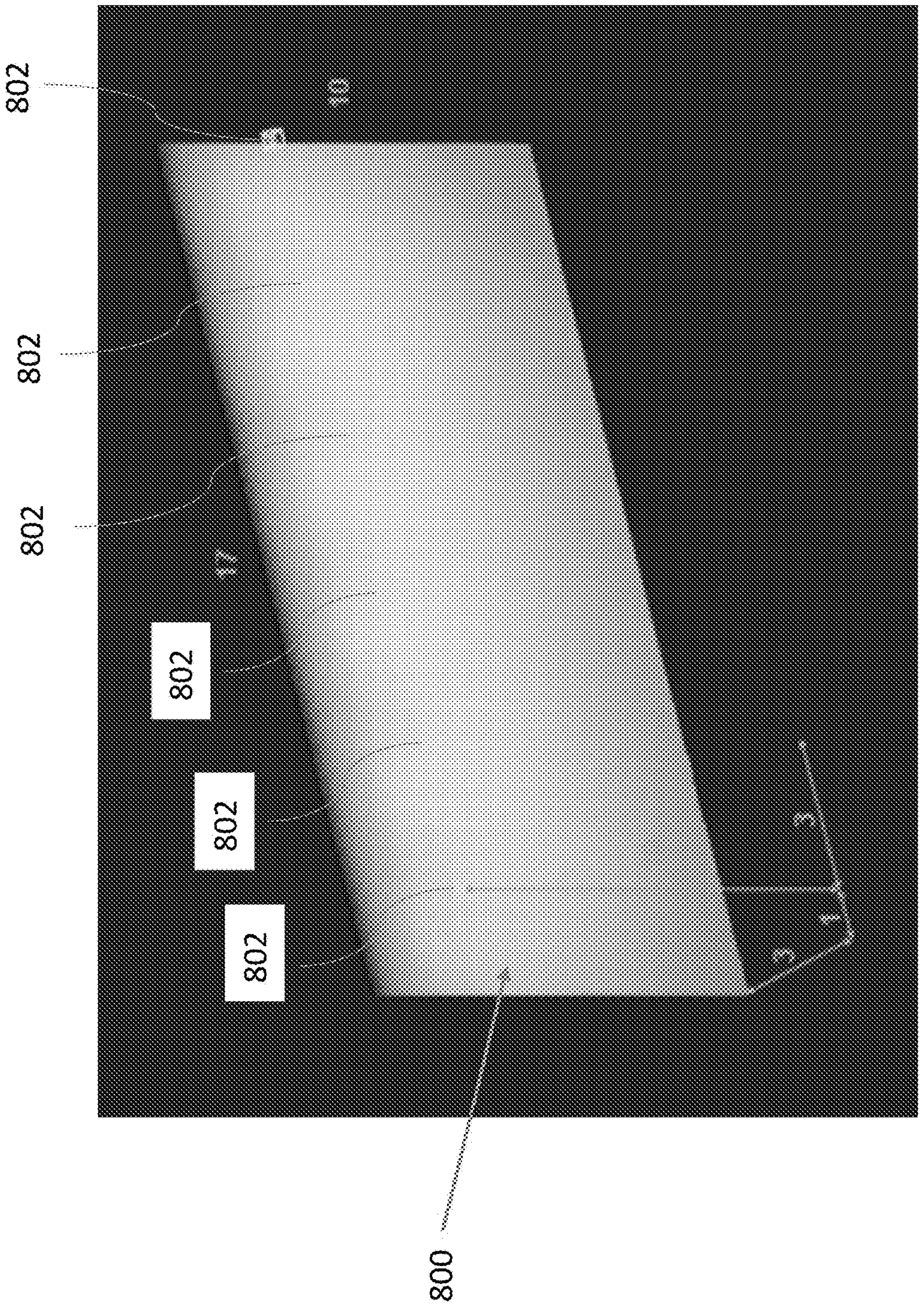
FIG. 8 is an image of a wall illuminated by a wall wash downlight system according to the current disclosure.

FIG. 7 is an image of a wall illuminated by a conventional wall wash downlight system. The illumination pattern on the wall is largely non-uniform with visible scalloping of the pattern. In contrast, FIG. 8 is an image of a wall 800 illuminated by a wall wash downlight system (defined by light fixtures 802) according to the current disclosure. As shown, greatly reduced scalloping and improved uniformity are realized with the system of the current disclosure.

Figure 9B:
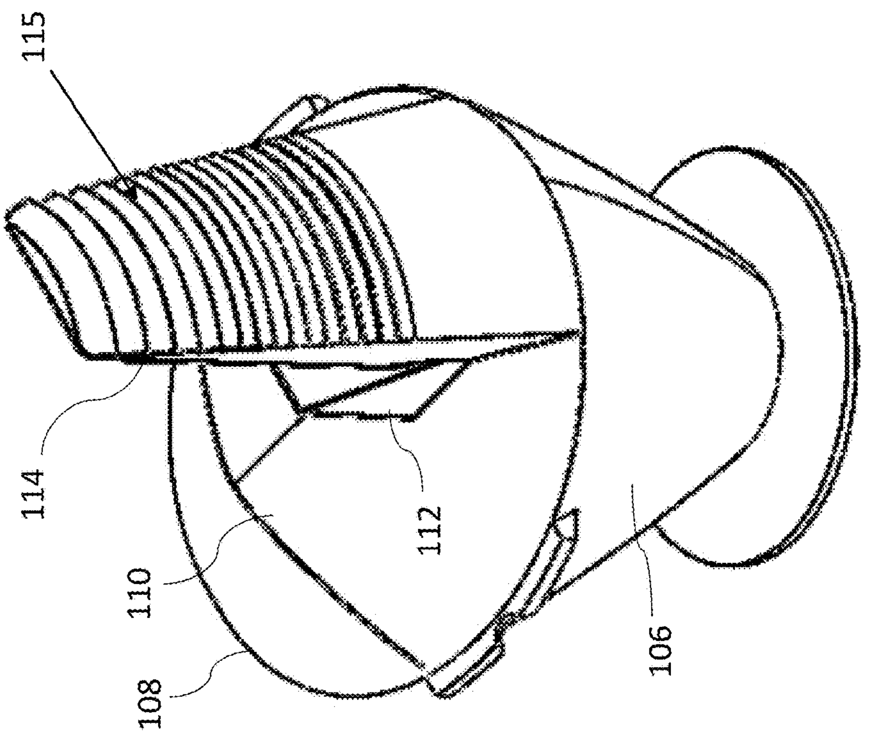
FIG. 9B is an isometric view of the optical element shown in FIG. 6, according to some exemplary embodiments.
Figure 9A:
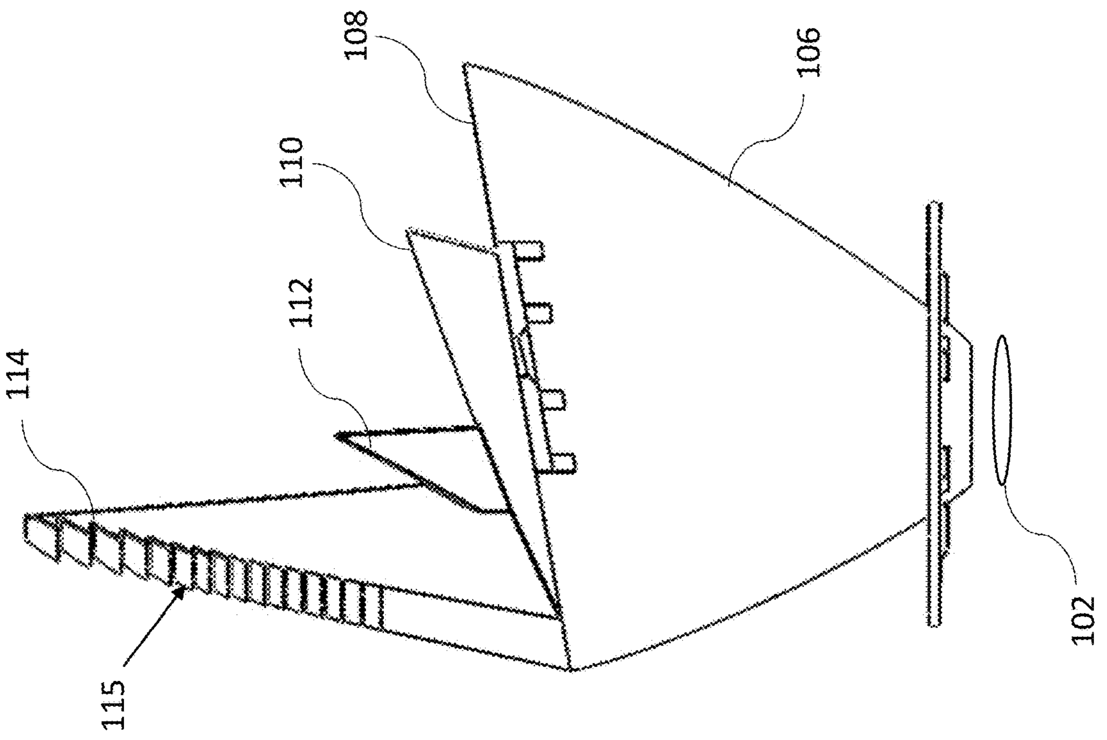
FIG. 9A is an elevational view of the optical element shown in FIG. 6, according to some exemplary embodiments.

FIGS. 9A and 9B are an elevational view and an isometric view, respectively, of optical element 106 shown in FIG. 6, according to some exemplary embodiments. Referring to FIGS. 9A and 9B, optical element 106 includes the four extraction elements 108, 110, 112, 114. Extraction element 114 includes a plurality of angled steps 115 formed on its surface. Also shown in FIG. 9A is the location of LED source 102. Extraction elements are progressively taller, with element 114 extending to ceiling plane 118, sending light to the top of the wall being illuminated by fixture 100.

Figure 10A:
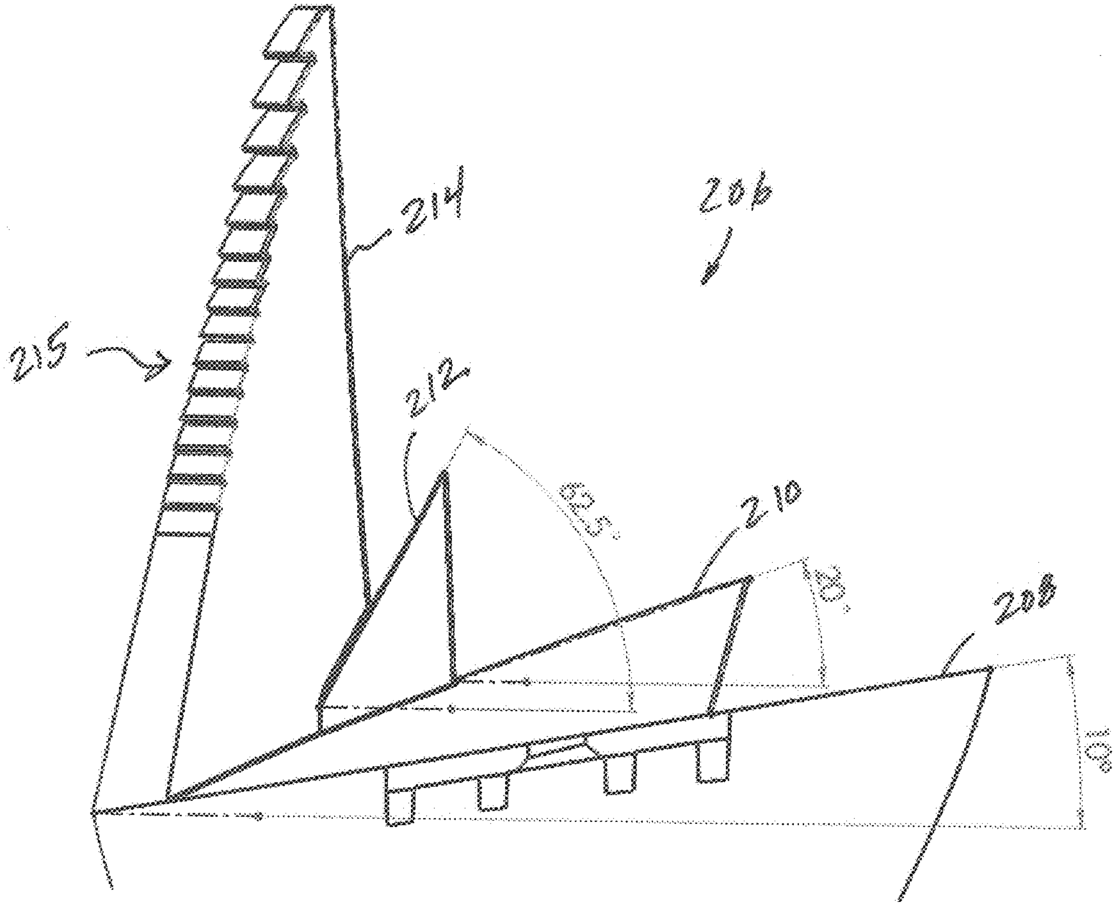
FIG. 10A is a schematic isometric view of a portion of an optical element, which is a specific alternative embodiment to the optical element shown in FIGS. 9A-B, according to some exemplary embodiments.
Figure 10B:
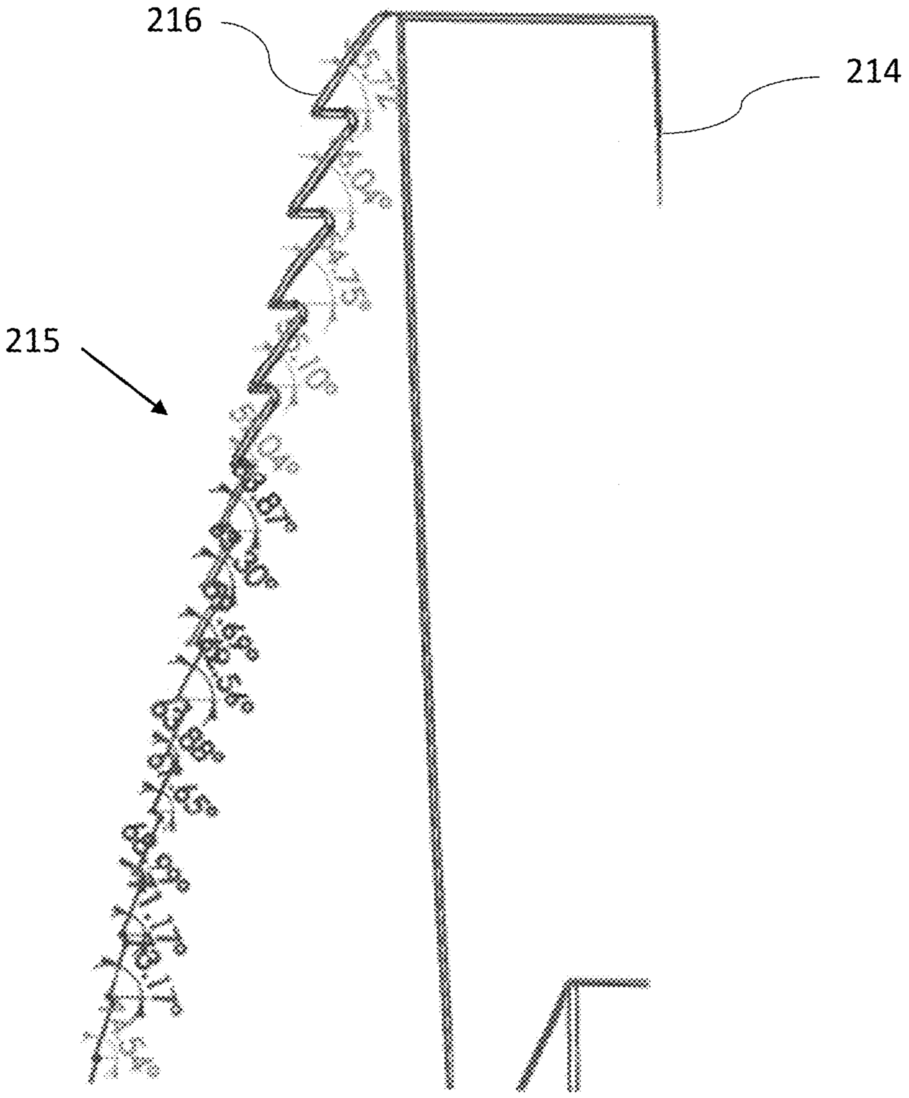
FIG. 10B is a schematic isometric view of a portion of the optical element of FIG. 10A, detailing angles of angled steps formed on a surface of an extraction element, according to some exemplary embodiments.

FIG. 10A is a schematic isometric view of a portion of an optical element 206, which is a specific alternative embodiment to optical element 106 of FIGS. 9A and 9B, according to some exemplary embodiments. FIG. 10B is a schematic isometric view of a portion of optical element 206 of FIG. 10A, detailing angles of angled steps 215 formed on a surface of extraction element 214, according to some exemplary embodiments. Referring to FIGS. 10A and 10B, in accordance with the specific exemplary embodiment illustrated, exemplary angles between surfaces of each extraction element 208, 210, 212 and a plane parallel to the ceiling plane associated with the fixture. While other angles may be used, the angles disclosed herein, or angles substantially close to those disclosed herein (i.e. +/−10%) have been found to be advantageous. For example, in some embodiments, the extraction elements can be positioned at the following angles from an imaginary horizontal plane: extraction element 208 at 10 degrees; extraction element 210 at 20 degrees; extraction element 212 at 62.5 degrees. FIG. 10B also illustrates exemplary angles for angled steps 215 formed on extraction element 214. In this particular exemplary embodiment, desirable characteristics of the resulting wall wash illumination pattern are obtained.

For example, this selection of angles allows for progressively extreme angles to be achieved as the light exits the luminaire, for the top cut 216 (angle of 55.72 degrees), the light that is reflecting from that cut 216 is exiting the luminaire at an angle of nearly 90 degrees, allowing for this light to exit the luminaire extremely close to the ceiling plane and illuminate the top of the wall, as shown in FIG. 6. Moving down the lens element 214 (with respect to the orientation shown in FIG. 10B) the angles of the cuts increases, and the light reflecting off of these cuts exits the luminaire at a generally progressively decreasing angle, so the light moves from illuminating the top of the wall to the top ⅓$^{rd}$ of the wall. In some embodiments, the angled steps shown in FIG. 10B can form the following angles, consecutively from top to bottom: 55.72 degrees; 56.04 degrees; 54.75 degrees; 55.10 degrees; 59.04 degrees; 63.87 degrees; 63.30 degrees; 69.69 degrees; 62.56 degrees; 63.88 degrees; 67.65 degrees; 68.99 degrees; 71.17 degrees; 73.17 degrees; and 74.54 degrees. These examples are only exemplary.

Figure 11A:
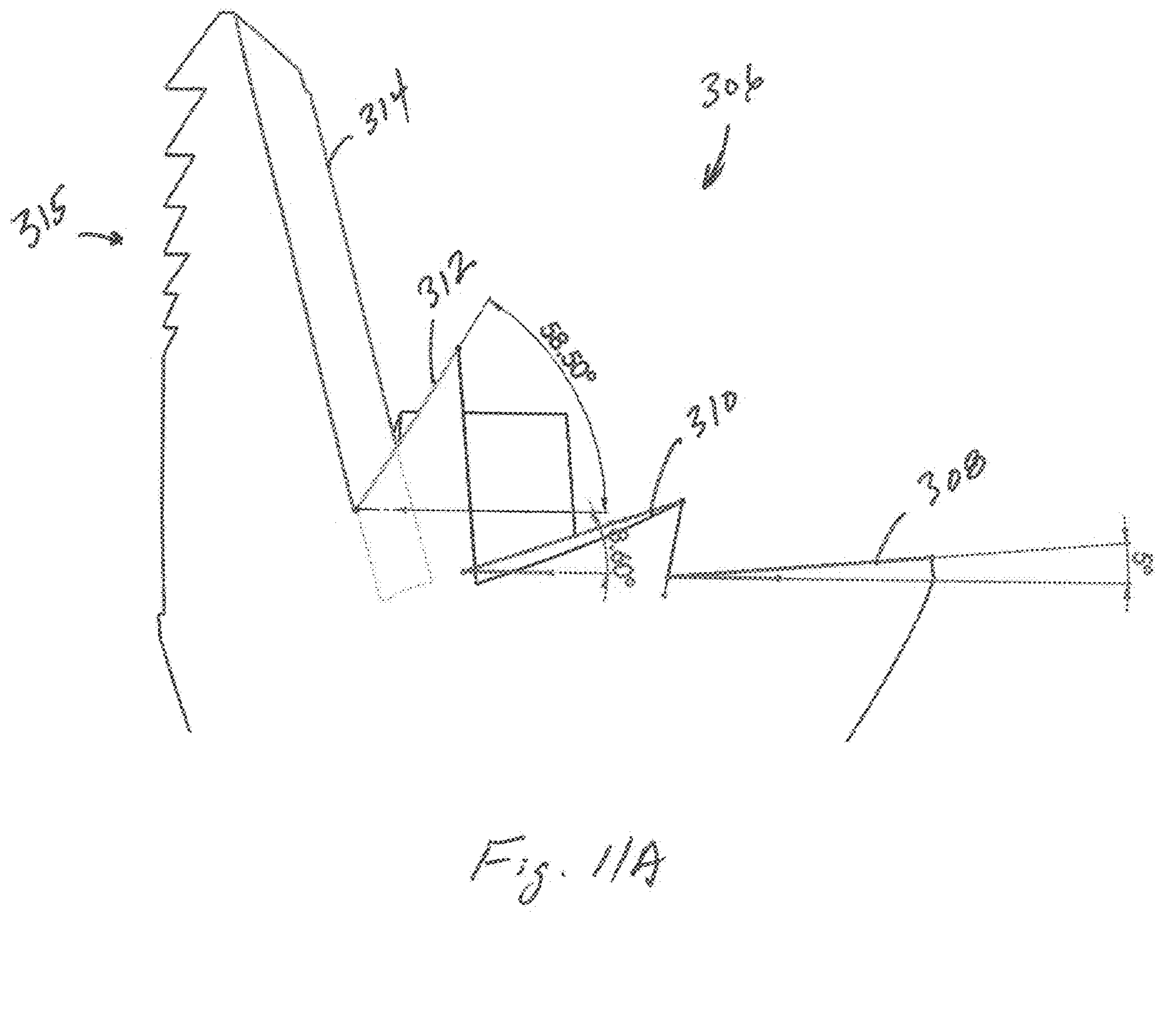
FIG. 11A is a schematic isometric view of a portion of another optical element, which is a specific alternative embodiment to the optical element shown in FIGS. 9A-9B, according to some exemplary embodiments.
Figure 11B:
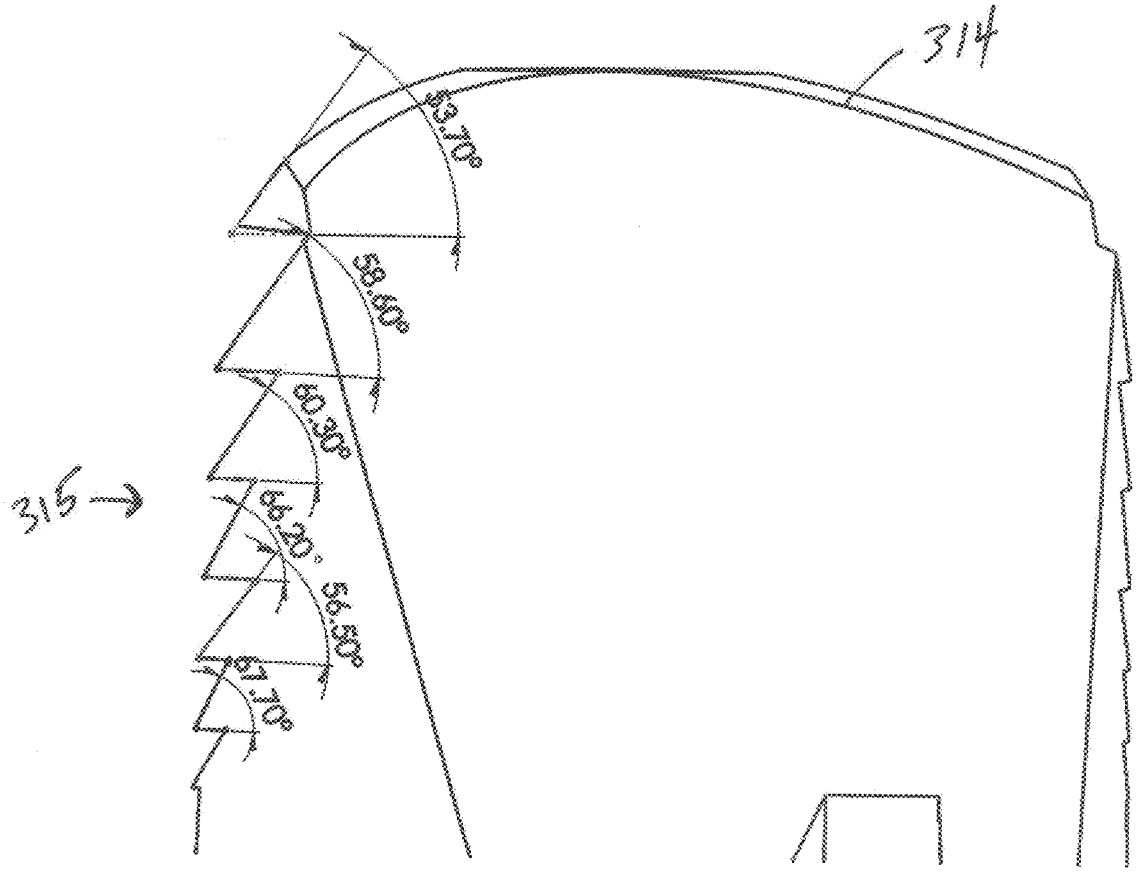
FIG. 11B is a schematic isometric view of a portion of the optical element of FIG. 11A, detailing angles of angled steps formed on a surface of an extraction element, according to some exemplary embodiments.

FIG. 11A is a schematic isometric view of a portion of an optical element 306, which is a specific alternative embodiment to optical element 106 of FIGS. 9A and 9B, according to some exemplary embodiments. FIG. 11B is a schematic isometric view of a portion of optical element 306 of FIG. 11A, detailing angles of angled steps 315 formed on a surface of extraction element 314, according to some exemplary embodiments. Referring to FIGS. 11A and 11B, in accordance with the specific exemplary embodiment illustrated, exemplary angles between surfaces of each extraction element 308, 310, 312 and a plane parallel to the ceiling plane associated with the fixture. For example, in some embodiments, the extraction elements can be positioned at the following angles from an imaginary horizontal plane: extraction element 308 at 5 degrees; extraction element 310 at 18.6 degrees; extraction element 312 at 58.5 degrees. These angles are only exemplary.

FIG. 11B also illustrates exemplary angles for angled steps 315 formed on extraction element 314. In this particular exemplary embodiment, desirable characteristics of the resulting wall wash illumination pattern are obtained. For example, extraction element 312 blends the light from element 314 and 310, extracting light and directing it towards the upper ⅓$^{rd}$ of the wall, element 310 extracts light and directs it towards the middle of the wall, while blending it with element 308. Element 308 extracts light and directs it towards the bottom of the wall. In some embodiments, the angled steps shown in FIG. 11B can form the following angles, consecutively from top to bottom: 53.7 degrees; 58.6 degrees; 60.3 degrees; 66.2 degrees; 56.5 degrees; 67.7 degrees. Again, it should be understood that all angles provided herein are exemplary only, and in some cases, substantially similar angles, or different angles, could also be used.

FIGS. 12A through 12G are schematic optical ray trace diagrams of an exemplary embodiment of wall wash downlight fixture 100 of the current disclosure, illustrating light paths 101 through fixture 100 to provide wall illumination, according to some exemplary embodiments. As shown in FIGS. 12A through 12G, according to the exemplary embodiments, the extraction elements formed on the internal optical element provide most of the light exiting fixture 100 laterally in the direction of the wall being illuminated.

Figure 12A:
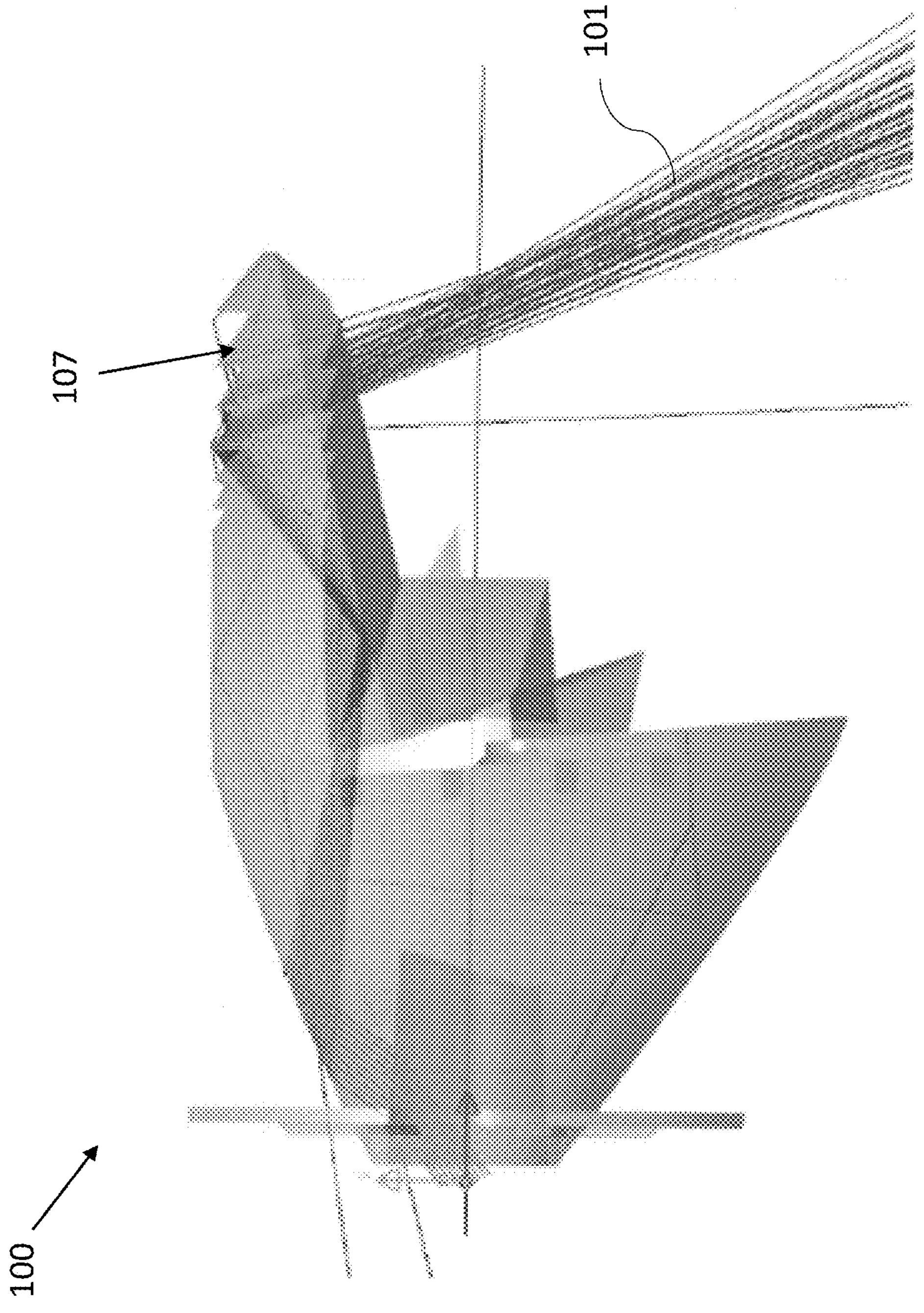
FIGS. 12A, 12B, 12C, 12D, 12E, 12F, and 12G are schematic optical ray trace diagrams of an exemplary embodiment of wall wash downlight fixture, according to some exemplary embodiments.
Figure 12B:
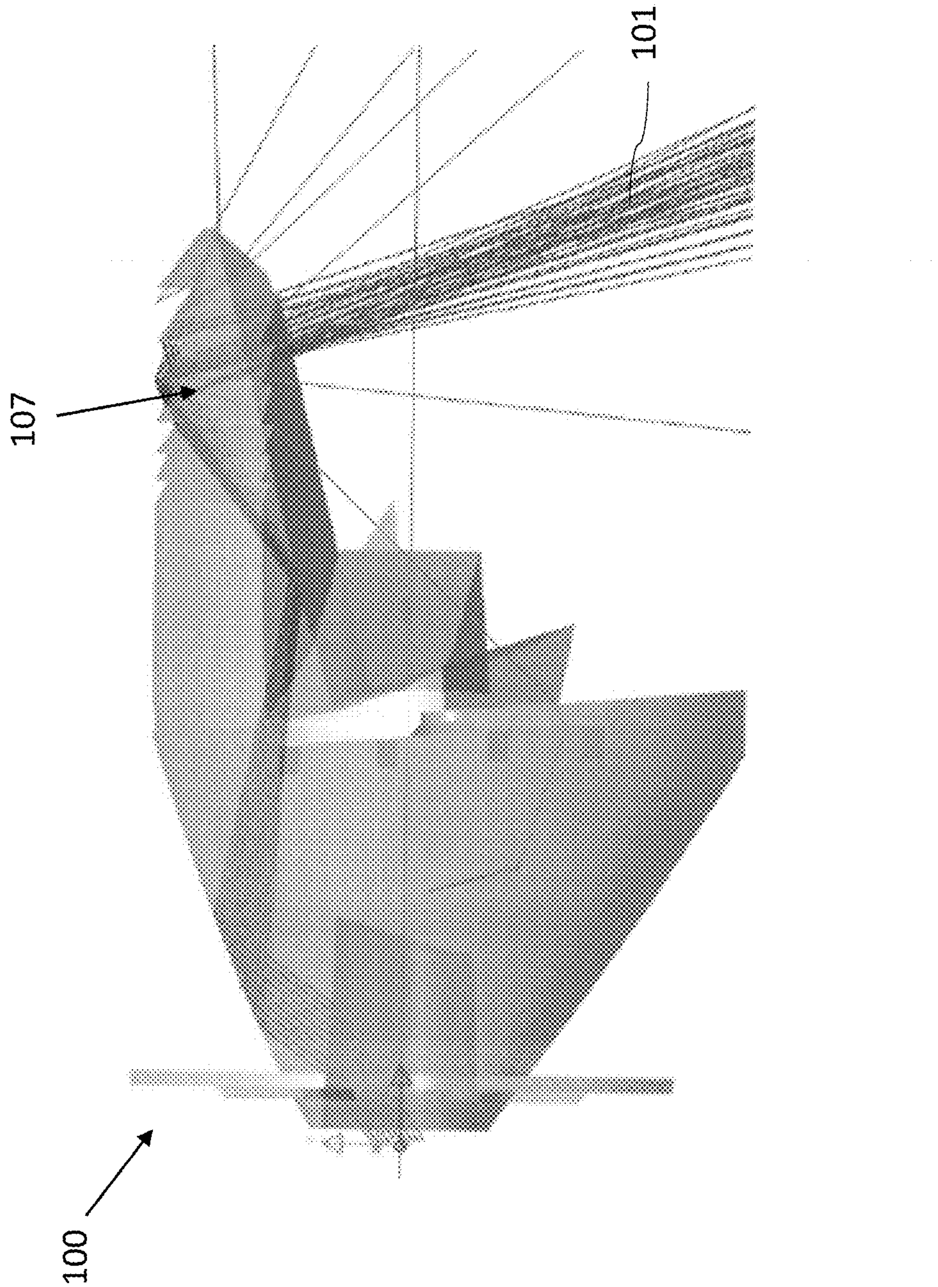
Figure 12C:
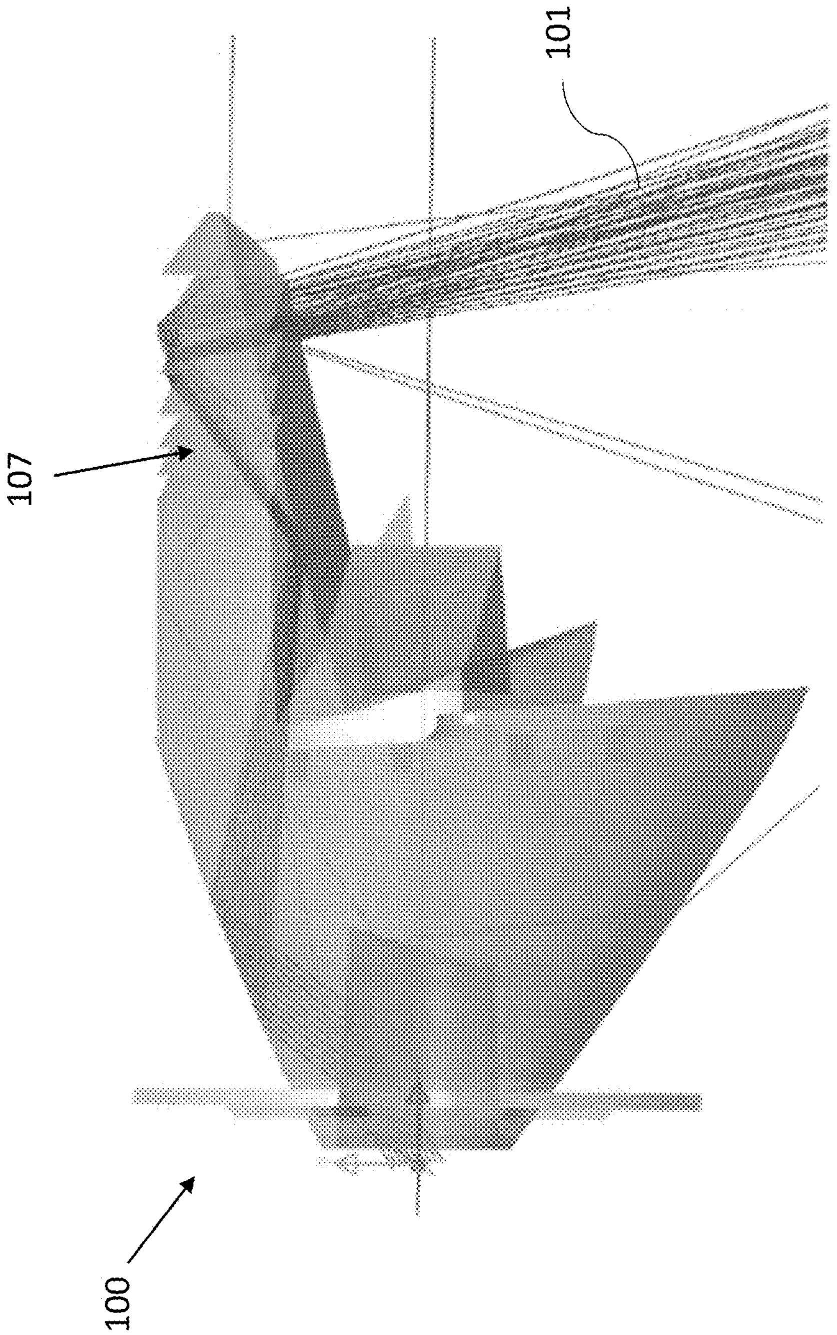
Figure 12D:
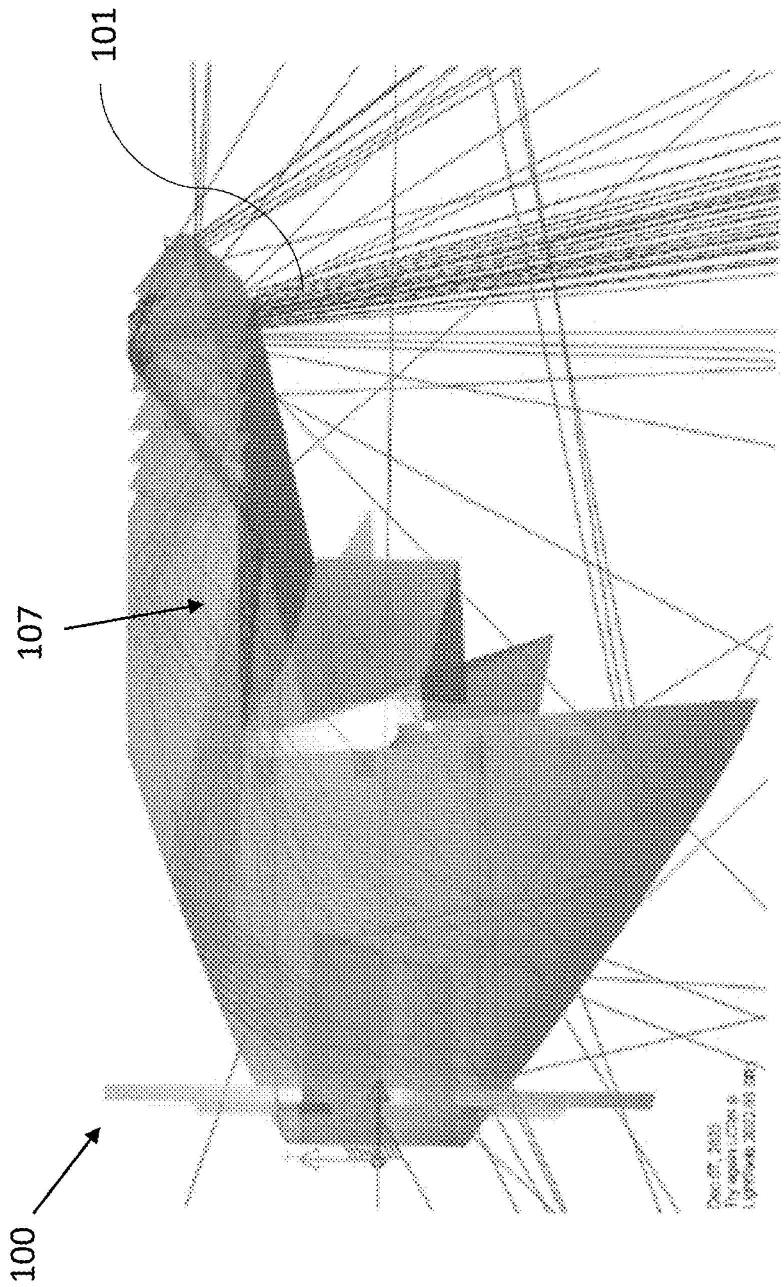
Figure 12E:
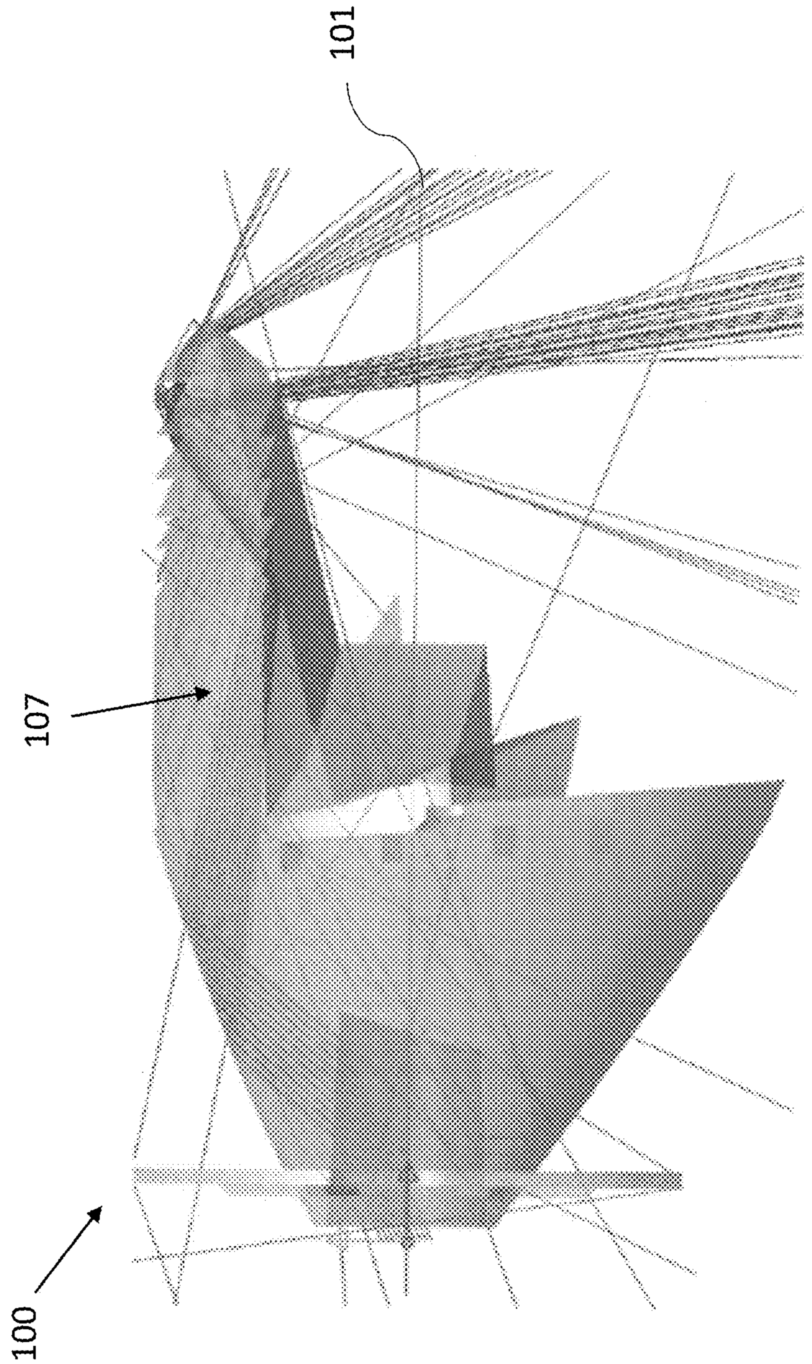
Figure 12F:
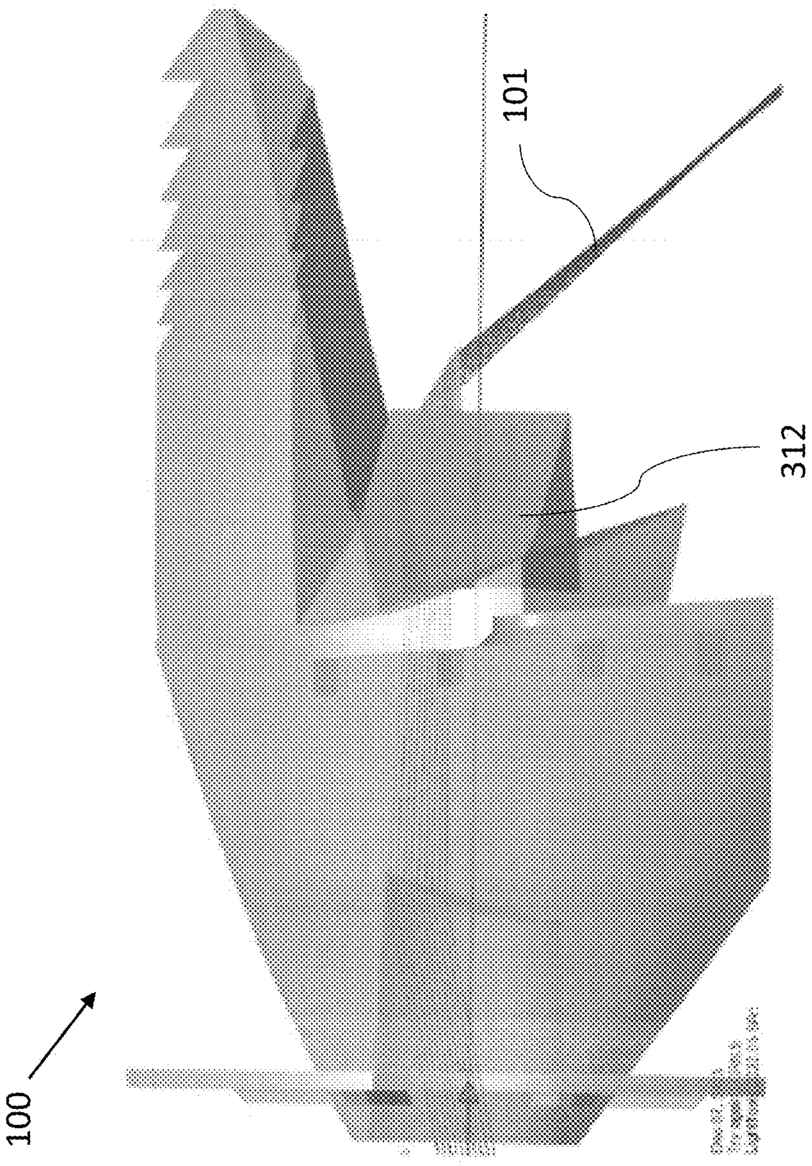
Figure 12G:
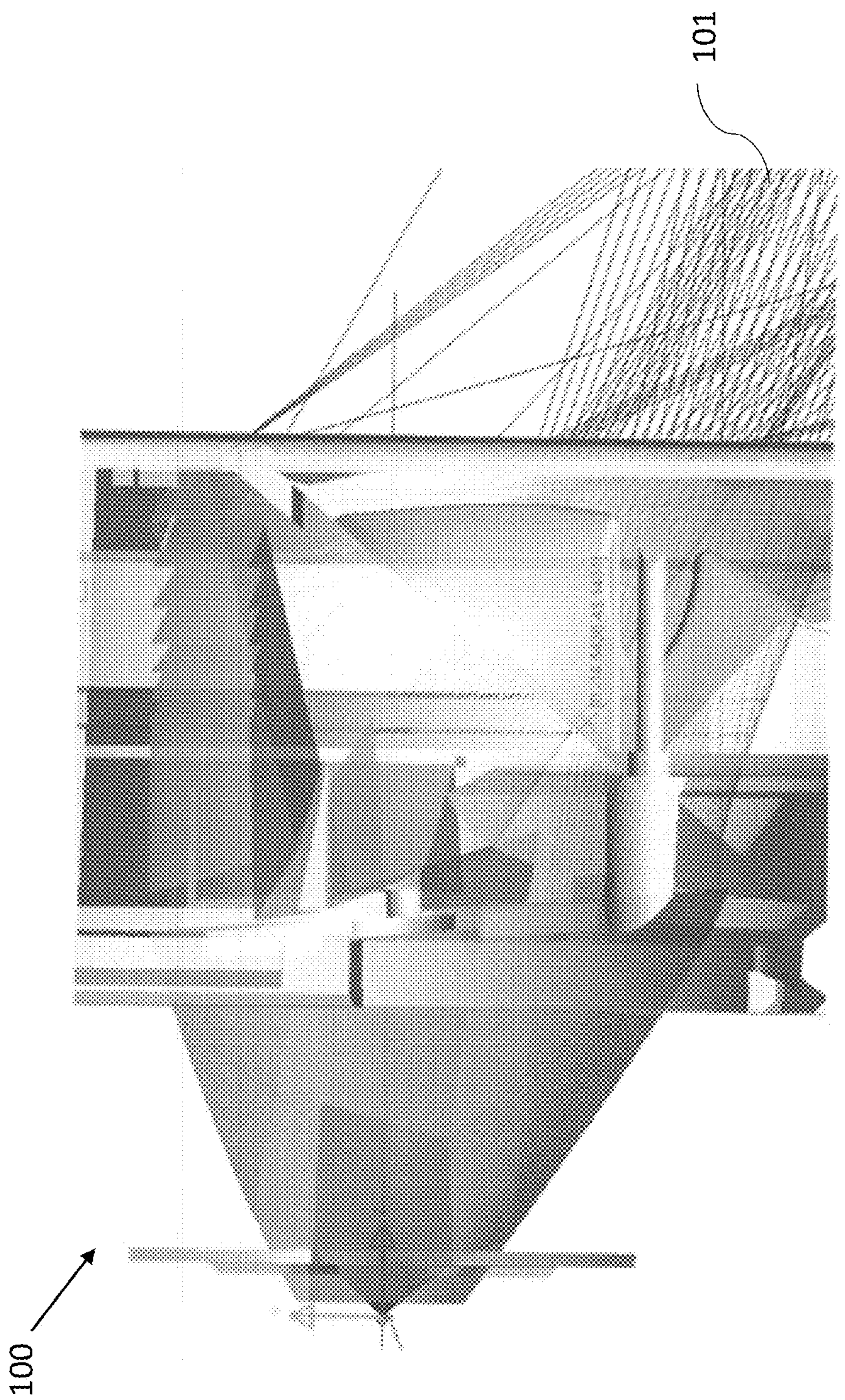

More particularly, FIG. 12A shows how light 101 is reflected internally from the asymmetric base collimator, then again on the vertical light guide plane, then finally reflects off of the extraction cuts 107 and leaves the optic at an angle near 90 degrees. In FIG. 12B, the angle from the light source changes and the light 101 eventually interacts with the extraction elements 107 higher on the vertical light guide plane, and so the light 101 leaves the optic at a more extreme angle. This is also demonstrated in FIGS. 12C, 12D, and 12E. In FIG. 12F, the light 101 does not enter the vertical light guide plane but instead is extracted through element 312 (from FIG. 11A), and as demonstrated this light 101 exits at a less extreme angle. In FIG. 12G, the light 101 interacts with all extraction elements of the system, each directing the light towards the wall and interacting with the different sections to avoid scalloping and undesirable effects on the wall.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A wall wash lighting fixture, comprising:

an input end at which light enters the fixture and an output end at which light exits the fixture, a longitudinal axis of the fixture extending longitudinally from the input end to the output end;

a light source for emitting light into an interior of the fixture at the input end of the fixture; and an optical element for receiving the light from the input end of the fixture, the optical element comprising an interior surface and a plurality of extraction elements for altering a path of the light passing through the fixture, such that light exiting the fixture at the output end of the fixture is directed laterally with respect to the longitudinal axis, wherein the interior surface is configured to provide total internal reflection (TIR) of the light from the light source to the plurality of extraction elements at a plurality of different angles.

2. The wall wash lighting fixture of claim 1, wherein the path of the light is altered by the optical element by internal reflection of the light.

3. The wall wash lighting fixture of claim 1, wherein the path of the light is altered by the optical element by refraction of the light.

4. The wall wash lighting fixture of claim 1, wherein the fixture is mountable on a ceiling adjacent to a wall, a plane of the ceiling being substantially coplanar with the output end of the fixture, the longitudinal axis of the fixture being substantially orthogonal to the plane of the ceiling, such that the light exiting the fixture is directed toward the wall to illuminate the wall.

5. The wall wash lighting fixture of claim 4, wherein each of the plurality of extraction elements has a surface forming a predetermined angle with the plane of the ceiling to provide a desired illumination pattern on the wall.

6. The wall wash lighting fixture of claim 4, wherein the plurality of extraction elements are formed progressively closer to the output end of the fixture.

7. The wall wash lighting fixture of claim 4, wherein one of the extraction elements includes a plurality of angled step features formed in a surface of the extraction element.

8. The wall wash lighting fixture of claim 7, wherein the angles of the angled step features are selected to provide a desired illumination pattern on the wall.

9. The wall wash lighting fixture of claim 4, wherein the plane of the ceiling and the wall are substantially perpendicular.

10. The wall wash lighting fixture of claim 1, wherein the optical element is a unitary device comprising the plurality extraction elements integrally formed in the optical element.

11. The wall wash lighting fixture of claim 1, wherein the optical element is made of an optically transparent material.

12. The wall wash lighting fixture of claim 1, wherein the optical element comprises at least one of acrylic, glass, polycarbonate, and silicone.

13. The wall wash lighting fixture of claim 1, wherein the light source is a light-emitting diode (LED) light source.

* * * * *